United States Patent [19]

Kato

[11] Patent Number: 4,737,799

[45] Date of Patent: Apr. 12, 1988

[54] THERMAL HEAD

[75] Inventor: Masakazu Kato, Furukawa, Japan

[73] Assignee: Alps Electric Co., Ltd., Japan

[21] Appl. No.: 920,839

[22] Filed: Oct. 17, 1986

[30] Foreign Application Priority Data

Oct. 18, 1985 [JP] Japan .............................. 60-232557

[51] Int. Cl.[4] .................... G01D 15/10; B05D 1/36; H01C 1/012

[52] U.S. Cl. .............................. 346/76 PH; 219/216; 427/402; 427/404; 338/308

[58] Field of Search .................. 346/76 PH; 219/216; 427/58, 90, 96, 402, 404; 338/308

[56] References Cited

U.S. PATENT DOCUMENTS

| | | | |
|---|---|---|---|
| 3,680,028 | 7/1972 | Black et al. | 338/308 |
| 4,136,274 | 1/1979 | Shibata et al. | 219/216 |

FOREIGN PATENT DOCUMENTS

| | | | |
|---|---|---|---|
| 56-159178 | 12/1981 | Japan | 400/120 |

OTHER PUBLICATIONS

Kanazawa, Gilbert, Trueba, "A High Speed, High Performance, Scanning Thin Film Thermal Printhead", Hewlett-Packard Co., Sep., 1980, pp. 122-127.

*Primary Examiner*—E. A. Goldberg
*Assistant Examiner*—Gerald E. Preston
*Attorney, Agent, or Firm*—Guy W. Shoup

[57] ABSTRACT

Disclosed is a thermal head including a heat-generating resistor layer, a power supply conductor layer, an anti-oxidation layer, and a wear-proof layer formed on an electrically insulating substrate, the wear-proof layer being made of a porous film of aluminum oxide which have holes filled with hard metals having good thermal conductivity.

2 Claims, 2 Drawing Sheets

THERMAL HEAD

BACKGROUND OF THE INVENTION

1. Field of the Invention

The present invention relates to a thermal head used for a thermal printer, and particularly relates to an improvement of a wear-proof layer of the same.

2. Description of the Prior Art

A thermal head to be mounted in a thermal printer is arranged such that, for example, a plurality of heat-generating resistor elements are linearly arranged on one and the same substrate so that the resistor elements are selectively energized in accordance with information to make thermo-sensitive recording paper color to thereby record the information on the paper, or to transfer the information onto ordinary paper through an ink ribbon to record the information on the paper.

Conventionally, as shown in FIG. 4, a thermal head has been manufactured by successively laminating a heat-generating resistor layer 3 including $Ta_2N$, a power supply conductor layer 4 including, Al, Ni, and so on, an oxidation-proof layer 5 including $SiO_2$, and a wear-proof layer 6 including $Ta_2O_5$, one by one on an electrically insulating substrate 1 of, for example, alumina or the like on which a glass glaze layer 2 is partially formed. In this case, the power supply conductor layer 4 is patterned to be constituted by a plurality of individual electrodes and a common electrode to form a heat-generating portion A between the common electrode and the respective individual electrode.

Recently, the thermal head has been required to be able to make record even on rough paper, to be able to make record at a high speed, to be able to be driven also by a battery, and so on. In order to realize those requirements, it is demanded to make the thermal conductivity of the heat generating portion good to thereby make the thermal efficiency high.

In the conventional thermal head, however, the wear-proof layer is a homogeneous layer including $Ta_2O_5$, so that heat is conducted isotropically and escapes in the transversal direction. Further, the material per se of the wear-proof layer is low in thermal conductivity. Therefore, it has not been possible to make the thermal efficiency of the thermal head sufficiently high.

SUMMARY OF THE INVENTION

It is therefore an object of the present invention to eliminate the disadvantages in the prior art.

It is another object of the present invention to provide a thermal head in which the thermal conductive property of the wear-proof layer per se is made high, the thermal conductive property in the direction perpendicular to the substrate is made good, and the thermal efficiency is improved.

In oder to attain the objects, according to an aspect of the present invention, the thermal head comprises at least a heat-generating resistor layer, a power supply conductor layer, an anti-oxidation layer, and a wear-proof layer formed on an electrically insulating substrate, in which the wear-proof layer is made of a porous film of aluminum oxide having holes filled with hard metals having good thermal conductivity.

Thus, owing to the hard metals filled in the holes of the porous film of aluminum oxide, not only the thermal conductivity of the wear-proof layer per se is made high but the thermal conductivity in the direction perpendicular to the substrate is made good. Thus, heat at the heat generating portions is facilitated to be transferred to an outer surface through the wear-proof layer to thereby improve the heat efficiency of the thermal head.

According to the present invention, preferably, the wear-proof layer may be formed such that, for example, an aluminum film is subject to anodic-oxidation to be made porous and hard metals are filled in the holes of the porous film of aluminum oxide by electroplating. In the anodic-oxidation, the holes are formed to extend from the surface of the film perpendicularly to the substrate, so that the hard metals are filled in the holes in the state elongated perpendicularly to the substrate. Therefore, the thermal conductivity in the direction perpendicular to the substrate is made higher than that in the transversal direction of the same so that the heat can be prevented from escaping in the transversal direction.

As the above-mentioned hard metals, any metals will do so long as the metals can be plated, are hard, and have a high melting point, however, preferably, they are selected from, for example, Cr, Ta, Mo, W, Ni, and so forth.

According to the present invention, preferably, the wear-proof layer is formed only at a heat-generating portion to make the thermal efficiency higher. Thus, in the case where the wear-proof layer is formed only at the heat-generating portion, the heat-generating portion is projected, so that not only the closeness of the heat generating portion to recording paper or an ink ribbon is made improved but the heat can be more surely prevented from escaping in the transversal direction.

DETAILED DESCRIPTION OF THE PREFERRED EMBODIMENTS

Figure 1:
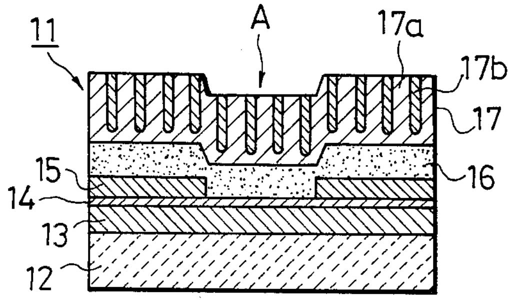
FIG. 1 is a cross-section showing a part of an embodiment of the thermal head according to the present invention.

FIG. 1 shows an embodiment of the thermal head according to the present invention.

The thermal head 11 has an electrically insulating substrate 12 of, for example, alumina or the like, and a glass glaze layer 13 is formed to a 40 μm thickness on the substrate 12. Although illustrated to be flat in FIG. 1 because FIG. 1 is a partially sectional view, the glass glaze layer 13 has factually such a configuration that it partially projects from the substrate 12. A heating resistor layer 14 of $Ta_2N$ is formed to a 0.05 μm thickness on the glass glaze layer 13. Further, an undercoating layer not-shown may be provided between the glass glaze layer 13 and the heat-generating resistor layer 14 so as to prevent the glass glaze layer 13 from being eroded by an etching liquid in a group of hydrofluoric acid. A power supply conductor layer 15 made of an aluminum film and having a thickness of 1.5 μm is formed on the heat-generating resistor layer 14. The power supply conductor layer 15 is etched to form a pattern having individual electrodes and a common electrode, so that the heating resistor layer 14 is exposed at the gaps among the individual and common electrodes. In use, later, heat will be generated at these gap portions when the resistor layer is energized. An anti-oxidation layer 16 of $SiO_2$ is formed to a thickness of 2 μm on the power supply conductor layer 15. Each of these layers is formed by spattering or vacuum evaporation. A wear-proof layer 17 is formed to a thickness of 5 to 10 μm on the anti-oxidation layer 16.

According to the embodiment of the present invention, the wear-proof layer 17 is constituted by a porous film of aluminum oxide having holes filled with hard metals **17*b* (Cr in the embodiment). In forming the wear-proof layer 17, a film of aluminum is formed on the anti-oxidation layer 16 by spattering, vacuum evaporation, or the like, and then subject to anodicoxidation to be made porous by a well-known means. Through the anodic-oxidation, the holes are formed to extend from the surface of the aluminum film toward the substrate perpendicularly thereto. The lower portion of the aluminum film is left as it is in the state of aluminum without being subject to anodicoxidation so as to be used as an electrode for electroplating the holes with the hard metals (Cr). The hard metals (Cr) are selectively attached to the inner portions of the holes having a higher electric potential to thereby fill the inside of the holes. Finally, the surface is ground, if necessary, so as to complete the wear-proof layer 17**.

In the thus arranged thermal head 11, the heat generated at the heat-generated portion A is well transferred to the surface through the hard metals **17*b* of the wear-proof layer 17. Further, the hard metals 17*b* are elongated perpendicularly to the substrate 12, so that the escape of heat in the transversal direction can be suppressed. Accordingly, the thermal head can more improved in heat efficiency than the conventional one. Both the Aluminum oxide film 17*a* and the hard metals 17*b*** have a wear-proof property so that it is possible to obtain sufficient durability of the thermal head.

Figure 2:
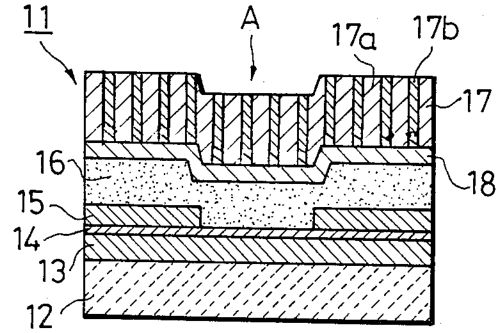
FIG. 2 is a cross-section showing a part of another embodiment of the thermal head according to the present invention.

FIG. 2 shows another embodiment of the thermal head according to the present invention. In FIG. 2, substantially the same components as those in Fig.1 are designated by the same reference numerals as those used in Fig.1 and the description about them will be omitted.

In a thermal head 11 in this embodiment, a metal layer 18 having a high melting point is formed on an anti-oxidation layer 16. For example, Cr, Mo, W, Ni, or the like, is used for the high melting point metal layer 18. A wear-proof layer 17 is formed on the high melting point layer 18. In this embodiment, the wear-proof layer 17 is formed such that an aluminum film is formed on the high melting point metal layer 18 and then subject to anodic-oxidation to be made porous. In this embodiment, the anodic-oxidation is performed to the entire aluminum film. The holes of the aluminum film is electroplated with hard metals (Cr in this embodiment) by using the high melting point metal layer 18 as an electrode. The hard metals (Cr) are selectively attached to the inner portions of the holes having a higher electric potential and filled in the holes. Finally, the surface is ground if necessary so as to complete the wear-proof layer.

In the thermal head 11 in this embodiment, the whole of the aluminum film of the wear-proof layer 17 is oxidized and the high melting point metal layer 18 is arranged under the wear-proof layer 17, so that the thermal head is made more superior in the heat-resisting property.

Figure 3:
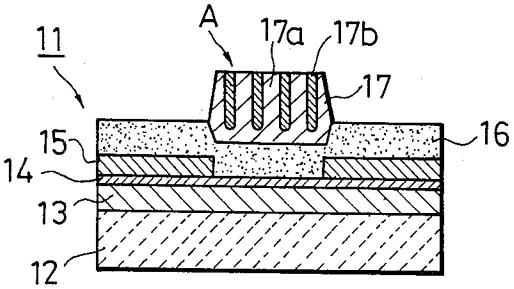
FIG. 3 is a cross-section showing a part of a further embodiment of the thermal head according to the present invention.
Figure 4:
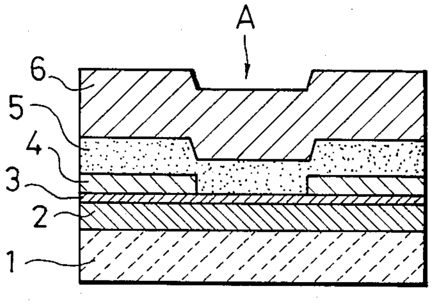
Fig. 4 PRIOR ART
FIG. 4 is a cross-section showing a part of an example of the conventional thermal head.

FIG. 3 shows a further embodiment of the thermal head according to the present invention. In FIG. 3, substantially the same components as those in FIG. 1 are designated by the same reference numerals as those used in FIG. 1 and the description about them will be omitted.

In a thermal head 11 in this embodiment, a wear-proof layer 17 is formed only at a portion corresponding to a heat-generating portion A. That is, an aluminum film is formed on an anti-oxidation layer 16. The aluminum film is masked at portions other than the heat-generating portion A and the heat-generating portion is subject to anodic-oxidation to be made porous. Similarly to the embodiment of FIG. 1, the lower portion of the aluminum film is left as it is in the form of aluminum without being subject to anodic-oxidation. Next, the aluminum film except the portion corresponding to the heat-generating portion A is removed by etching. The holes of the thus formed film of aluminum oxide are electroplated with hard metal (Cr) by using the lower portion of the film aluminum oxide film as an electrode. Thereafter, the same process is attained as in the preceding embodiments to thereby complete the wear-proof layer 17.

In the thermal head 11 of this embodiment, not only the heat-generating portion A is projected so that the contacting property with recording paper or an ink ribbon is made good but the heat transfer of the wear-proof layer 17 is limited at the heat-generating portion A so that the heat efficiency is more improved.

As described above, according to the present invention, the wear-proof layer is made of a porous aluminum oxide film having holes filled with hard metals having good thermal conductivity so that not only the thermal conductivity of the wear-proof layer per se is made high but the thermal conductivity in the direction perpendicular to the substrate is made good. Thus, heat at the heat generating portions is facilitated to be transferred to an outer surface through the wear-proof layer to thereby improve the heat efficiency of the thermal head.

What is claimed is:

1. A thermal head comprising: a heat-generating resistor layer, a power supply conductor layer, an anti-oxidation layer, and an outer wear-proof layer, said layers being successively formed on an electrically insulating substrate, said wear-proof layer being made of a porous film aluminum oxide having holes filled with hard metals which have good thermal conductivity.

2. A thermal head according to claim 1, wherein said wear-proof layer is formed only at a heat-generating portion.

* * * * *